(12) United States Patent
Yu et al.

(10) Patent No.: US 9,631,975 B2
(45) Date of Patent: Apr. 25, 2017

(54) OPTICAL SENSOR CIRCUIT

(71) Applicant: AU Optronics Corp., Hsin-Chu (TW)

(72) Inventors: Jian-Shen Yu, Hsin-Chu (TW); Wei-Chih Hsu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 110 days.

(21) Appl. No.: 14/800,715

(22) Filed: Jul. 16, 2015

(65) Prior Publication Data

US 2016/0020337 A1    Jan. 21, 2016

(30) Foreign Application Priority Data

Jul. 21, 2014   (TW) .............................. 103124989 A (51) Int. Cl.
*G01J 1/44*    (2006.01)
(52) U.S. Cl.
CPC ....................................... *G01J 1/44* (2013.01)

(58) Field of Classification Search
CPC ........................................................ G01J 1/44
See application file for complete search history.

(56) References Cited

U.S. PATENT DOCUMENTS

| 2004/0032926 | A1* | 2/2004 | Yu | ........................... | G11C 19/28 377/64 |
| 2007/0188196 | A1* | 8/2007 | Yu | ..................... | H03K 19/01714 326/88 |
| 2016/0370224 | A1* | 12/2016 | Liu | ........................ | G01J 1/4228 |

\* cited by examiner

*Primary Examiner* — Tony Ko
(74) *Attorney, Agent, or Firm* — Locke Lord LLP; Tim Tingkang Xia, Esq.

(57) ABSTRACT

An optical sensor circuit includes a capacitor, a first transistor, a second transistor, a third transistor, a fourth transistor, and a fifth transistor. The capacitor includes a first terminal and a second terminal. Each transistor includes a first terminal, a control terminal, and a second terminal. The second terminal of the capacitor is coupled to a reference voltage terminal. The first terminals of the third transistor and the fourth transistor are coupled to a first voltage terminal. The second terminal of the fifth transistor is coupled to a readout line.

17 Claims, 7 Drawing Sheets

OPTICAL SENSOR CIRCUIT

BACKGROUND

1. Technical Field

The present invention illustrates an optical sensor circuit, and more particularly, the optical sensor circuit having a capability of ambient light resistance.

2. Description of the Prior Art

With the advancement of technologies, various electronic devices with different input interfaces are adopted to our daily life. Specifically, these electronic devices often use an input panel as a communication interface between users and the function-mapping of electronic devices. Users can operate the electronic devices for processing various functions by inputting commands on the input panel, instead of using conventional keyboard or mouse. Generally, two input modes of the input panel can be categorized to an optical sensor input mode and a touch input mode. However, since the touch input mode requires a touch activity for contacting with the input panel, the lifetime of the input panel may be reduced by material abrasion. Thus, the input panel using the optical sensor input mode has a longer lifetime of work than the input panel using the touch input mode.

In the input panel having the optical sensor input mode, the input panel includes a plurality of light sensor units. Each light sensor unit has a plurality of transistors. Particularly, given a negative bias voltage being fixed in each transistor, when an incident light is increased, a light current generated by the transistor is increased accordingly. By using the transistor to generate the light current, the light sensor unit can identify whether the incident light is inputted to the input panel, such the input panel using the optical sensor input mode is usually applied to detect a specific light source. For example, the input panel is used for detecting a red light source from a laser pen with a red color. Specifically, when the input panel is used to detect the specific light source, some transistors of the light sensor unit are covered with corresponding light filters. As known, a light filter can be regarded as a band-pass filter for extracting/passing desired light photons with respect to a predetermined light spectrum band, exclusive of other light photons with respect to other light spectrum bands. For example, when a transistor is covered with a light filter with the red color, the transistor only generates light current by inputting an incident light with the red color. Thus, in this case, the light sensor unit can make a correct response to detect the incident light with the red color from the laser pen.

However, a white ambient light here is considered. Specifically, the white ambient light includes all light spectrum bands of all colors (i.e., R/G/B overlapped spectrum bands). In the conventional optical sensor, when an intensity of the white ambient light is too strong, the light sensor unit may error because the light sensor unit determines the incident light with red color is being inputted to the input panel, even when the laser pen with red color is turned off. The reason is illustrated as below. Since the white ambient light can be decomposed to three original colors (i.e., red, green, and blue), when the intensity of the white ambient light is strong enough, the intensity of red color component of the white ambient light is also proportionally increased. Thus, the light sensor unit makes a wrong decision because of the enhancement of the red color component. In other words, when the light sensor unit receives the white ambient light, the light current (or say, voltage) of the light sensor unit used for detecting the specific light color may be varied in wrong conditions with the intensity of the white ambient light being increased, thereby leading to a severe shadow effect. As a result, since the SNR (Signal-to-Noise Ratio) of the detection mechanism of the light sensor unit is reduced, a probability of false alarm/error detection of the light sensor unit is increased.

Thus, to develop an optical sensor circuit having a capability of ambient light resistance is important.

SUMMARY

In an embodiment of the present invention, an optical sensor circuit is disclosed. The optical sensor circuit includes a capacitor, a first transistor, a second transistor, a third transistor, a fourth transistor, and a fifth transistor. The capacitor includes a first terminal and a second terminal coupled to a reference voltage terminal. The first transistor includes a first terminal coupled to the first terminal of the capacitor, a control terminal, and a second terminal. The second transistor includes a first terminal coupled to the second terminal of the first transistor, a control terminal, and a second terminal. The third transistor includes a first terminal coupled to a first voltage terminal, a control terminal, and a second terminal coupled to the second terminal of the first transistor. The fourth transistor includes a first terminal coupled to the first terminal of the third transistor, a control terminal, and a second terminal coupled to the second terminal of the first transistor. The fifth transistor includes a first terminal coupled to the first terminal of the first transistor, a control terminal, and a second terminal coupled to a readout line.

In another embodiment of the present invention, an optical sensor circuit is disclosed. The optical sensor circuit includes a capacitor, a first transistor, a second transistor, a third transistor, a fourth transistor, and a fifth transistor. The capacitor includes a first terminal and a second terminal coupled to a reference voltage terminal. The first transistor includes a first terminal, a control terminal coupled to the first terminal of the capacitor, and a second terminal coupled to the control terminal of the first transistor. The second transistor includes a first terminal for receiving a first driving signal, a control terminal coupled to the first terminal of the first transistor, and a second terminal coupled to the control terminal of the second transistor. The third transistor includes a first terminal coupled to the second terminal of the second transistor, a control terminal coupled to a low voltage terminal, and a second terminal coupled to the control terminal of the third transistor. The fourth transistor includes a first terminal coupled to the first terminal of the third transistor, a control terminal coupled to the low voltage terminal, and a second terminal coupled to the control terminal of the fourth transistor. The fifth transistor includes a first terminal coupled to the first terminal of the capacitor, a control terminal for receiving a second driving signal, and a second terminal coupled to a readout line.

In another embodiment of the present invention, an optical sensor circuit is disclosed. The optical sensor circuit includes a capacitor, a first transistor, a second transistor, a third transistor, a fourth transistor, a fifth transistor, and a sixth transistor. The capacitor includes a first terminal and a second terminal coupled to a reference voltage terminal. The first transistor includes a first terminal coupled to the first terminal of the capacitor, a control terminal, and a second terminal. The second transistor includes a first terminal coupled to the second terminal of the first transistor, a control terminal for receiving a first driving signal, and a second terminal coupled to the control terminal of the first transistor. The third transistor includes a first terminal coupled to the second terminal of the second transistor, a control terminal for receiving a second driving signal, and a second terminal coupled to the control signal of the third transistor. The fourth transistor includes a first terminal coupled to a high voltage terminal, a control terminal coupled to the first terminal of the third transistor, and a second terminal coupled to the control terminal of the fourth transistor. The fifth transistor includes a first terminal coupled to the first terminal of the fourth transistor, a control terminal coupled to the second terminal of the fourth transistor, and a second terminal coupled to the control terminal of the fifth transistor. The sixth transistor includes a first terminal coupled to the first terminal of the capacitor, a control terminal for receiving a third driving signal, and a second terminal coupled to a readout line.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
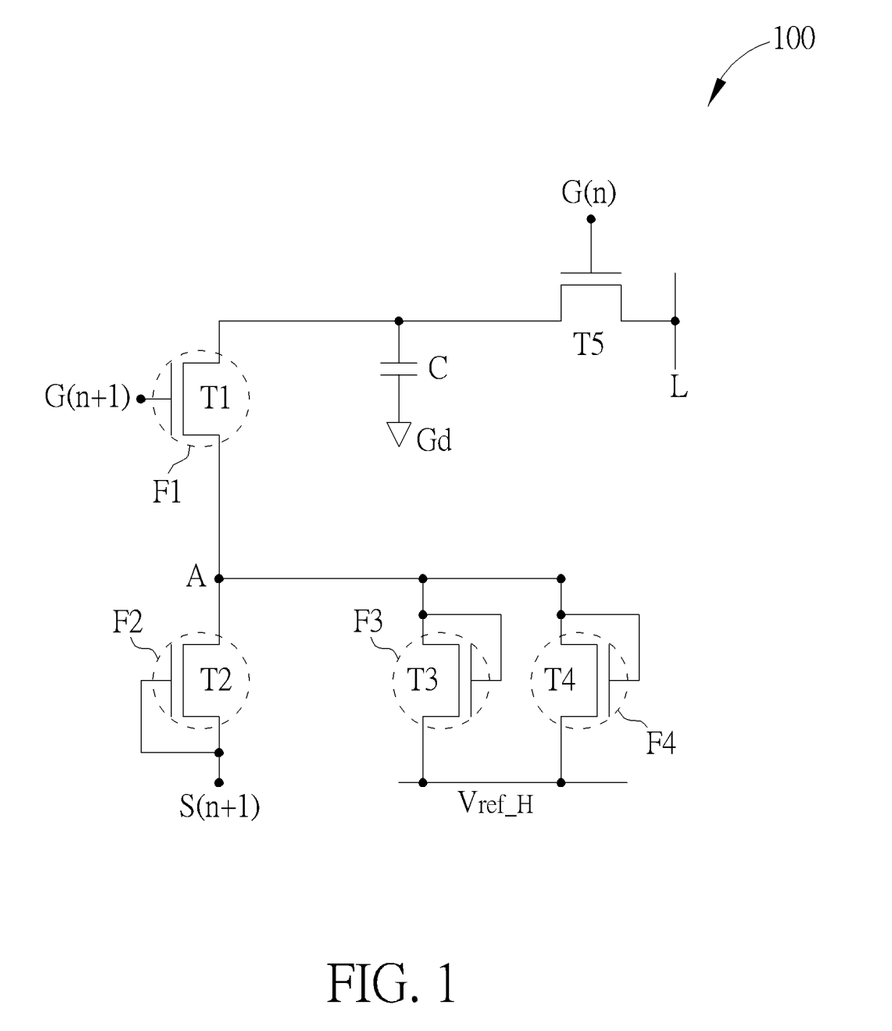
FIG. 1 illustrates an optical sensor circuit according to a first embodiment of the present invention.

FIG. 1 illustrates an optical sensor circuit 100 according to a first embodiment of the present invention. As shown in FIG. 1, the optical sensor circuit 100 includes a capacitor C, a first transistor T1, a second transistor T2, a third transistor T3, a fourth transistor T4, and a fifth transistor T5. The capacitor C includes a first terminal and a second terminal. The second terminal of the capacitor C can be coupled to any reference voltage terminal, such as a ground terminal Gd. A first terminal of the first transistor T1 is coupled to the first terminal of the capacitor C. A control terminal of the first transistor T1 is used for receiving a first driving signal G(n+1). A first terminal of the second transistor T2 is coupled to a second terminal of the first transistor T1. A control terminal of the second transistor T2 is used for receiving a second driving signal S(n+1). A second terminal of the second transistor T2 is coupled to the control terminal. A first terminal of the third transistor T3 is coupled to a high voltage terminal Vref_H. A control terminal of the third transistor T3 is coupled to the first terminal of the second transistor T2. A second terminal of the third transistor T3 is coupled to the control terminal of the third transistor T3. A first terminal of the fourth transistor T4 is coupled to the first terminal of the third transistor T3. A control terminal of the fourth transistor T4 is coupled to the control terminal of the third transistor T3. A second terminal of the fourth transistor T4 is coupled to the control terminal of the fourth transistor T4. A first terminal of the transistor T5 is coupled to the first terminal of the first transistor T1. A control terminal of the transistor T5 is used for receiving a third driving signal G(n). A second terminal of the transistor T5 is coupled to a readout line L. In the optical sensor circuit 100, the first driving signal G(n+1) denotes as a gate driving signal from an output of an $(n+1)^{th}$ stage shift register. The second driving signal S(n+1) denotes as a source driving signal from an output of an $(n+1)^{th}$ data line. The third driving signal G(n) denotes as a gate driving signal from an output of an $n^{th}$ stage shift register, wherein n is a positive integer.

In the optical sensor circuit 100, the first transistor T1 is covered with a first optical filter F1. The second transistor T2 is covered with a second optical filter F2. The third transistor T3 is covered with a third optical filter F3. The fourth transistor T4 is covered with a fourth optical filter F4. Each optical filter is used for filtering a specific color. Particularly, two colors with respect to the first optical filter F1 and the second optical filter F2 are identical. The two identical colors with respect to the first optical filter F1 and the second optical filter F2 are chosen from a color set among a red color, a blue color, and a green color. Specifically, two colors with respect to the third optical filter F3 and the fourth optical filter F4 are distinct. The two distinct colors are different from the two identical colors. The two distinct colors with respect to the third optical filter F3 and the fourth optical filter F4 are chosen from the color set among the red color, the blue color, and the green color. The fifth transistor T5 is covered with a light shield. A light detection process of the optical sensor circuit 100 is illustrated below.

Figure 2:
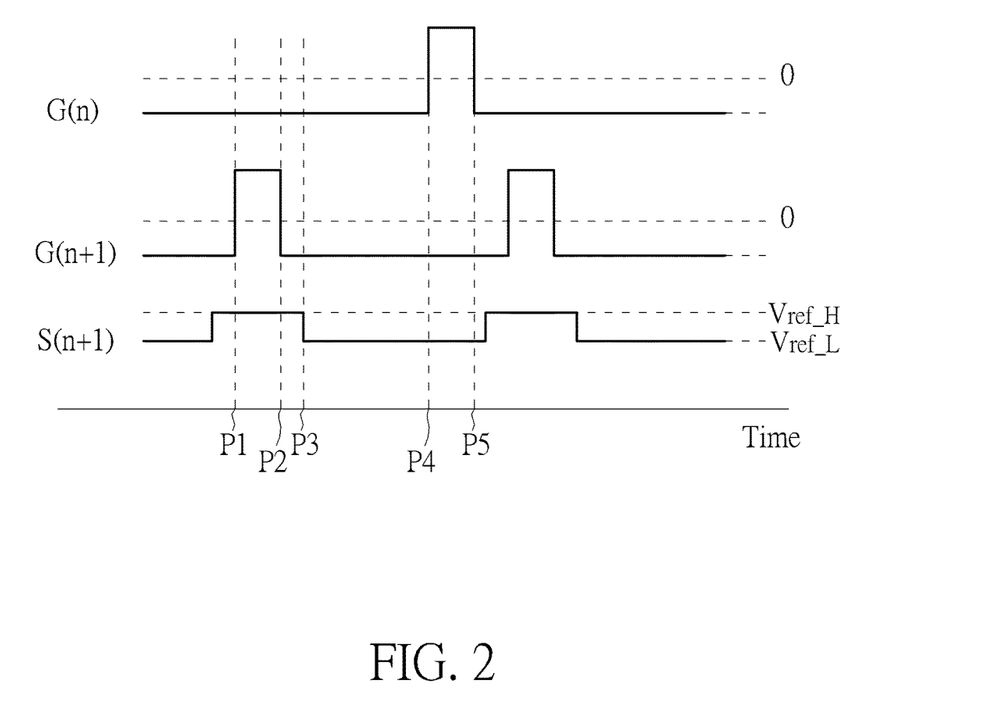
FIG. 2 illustrates waveforms of diving signals of the optical sensor circuit in FIG. 1.

FIG. 2 illustrates waveforms of diving signals of the optical sensor circuit 100. As shown in FIG. 2. The waveforms of diving signals include a first driving signal G(n+1), a second driving signal S(n+1), and a third driving signal G(n). Here, a dotted-line on the first driving signal G(n+1) denotes a zero voltage level. An upper dotted-line on the second driving signal S(n+1) denotes a voltage level of a high voltage terminal Vref_H. A lower dotted-line on the second driving signal S(n+1) denotes a voltage level of a low voltage terminal Vref_L. A dotted-line on the third driving signal G(n) denotes the zero voltage level. A time point P1, a time point P2, a time point P3, a time point P4, and a time point P5 are used for partitioning the processing time to several time intervals with respect to several processing modes of the optical sensor circuit 100.

For presentation simplicity, an example of light detection process of the optical sensor circuit 100 during several time intervals is illustrated. Please also refer to FIG. 1. In the optical sensor circuit 100, a color of the first optical filter F1 is a red color. A color of the second optical filter F2 is also the red color. A color of the third optical filter F3 is a blue color. A color of the fourth optical filter F4 is a green color. During the time interval between the time point P1 and the time point P2, the first driving signal G(n+1) becomes a high voltage signal and the second driving signal S(n+1) also becomes a high voltage signal. Thus, in FIG. 1, the control terminal of the first transistor T1 receives the first driving signal G(n+1) with high voltage level, leading to enable the conduction of the first transistor T1. Similarly, the control terminal of the second transistor T2 receives the second driving signal S(n+1) with high voltage level, leading to enable the conduction of the second transistor T2. Since the first terminals of the third transistor T3 and the fourth transistor T4 are coupled to the high voltage terminal Vref_H, the second terminals of the third transistor T3 and the fourth transistor T4 have voltage levels equal to a voltage level of the high voltage terminal Vref_H due to the conduction of the first transistor T1. Thus, no voltage difference is introduced between the first terminals and the second terminals of the third transistor T3 and the fourth transistor T4. During the time interval between the time point P1 and the time point P2, since the control terminal of the fifth transistor T5 receives a third driving signal G(n) with low voltage level, the conduction of the fifth transistor T5 is disabled so that a current of the capacitor C cannot be transmitted to the readout line L. Thus, the current is transmitted from the second transistor T2 to the capacitor through the first transistor T1. During the time interval between the time point P1 and the time point P2, the capacitor is charged to a voltage level approximated to a voltage level of the high voltage terminal Vref_H. In the embodiment, the processing mode of the optical sensor circuit 100 during the time interval between the time point P1 and the time point P2 is called as a reset mode. In the following, during a time interval between the time point P2 and the time point P3, the first driving signal G(n+1) becomes a low voltage signal and the second driving signal S(n+1) maintains a high voltage signal. Thus, the second driving signal S(n+1) with high voltage level cannot be transmitted to the capacitor C through the second transistor T2 and the first transistor T1.

During a time interval between the time point P3 and the time point P4, the first driving signal G(n+1) becomes a low voltage signal and the second driving signal S(n+1) also becomes a low voltage signal. Here, the control terminal of the first transistor T1 receives the first driving signal G(n+1) with a low voltage level. The control terminal of the second transistor T2 receives the second driving signal S(n+1) with a low voltage level. Thus, the first transistor T1 and the second transistor T2 are operated under negative bias voltages or zero bias voltages, and can be used for detecting whether a red incident light is inputted. Specifically, the control terminal of the third transistor T3 is coupled to the second terminal of the third transistor T3 and the control terminal of the fourth transistor T4 is coupled to the second terminal of the fourth transistor T4. As a result, a voltage difference between the control terminal and the second terminal of the third transistor T3 (i.e., Vgs) is zero. Similarly, a voltage difference between the control terminal and the second terminal of the fourth transistor T4 (i.e., Vgs) is zero. Thus, the third transistor T3 and the fourth transistor T4 are operated under zero bias voltages, and can be respectively used for detecting whether a blue incident light is inputted and a green incident light is inputted. Since the control terminal of the fifth transistor T5 receives a third driving signal G(n) with the low voltage level, the conduction of the fifth transistor T5 is disabled so that the current cannot be transmitted from the fifth transistor T5 to the readout line L. When the optical sensor circuit 100 receives a red light from a laser pen with a red color, a light current $I_1$ is transmitted from the first terminal of the capacitor C (i.e., the capacitor has already been charged with high voltage) to the second transistor T2 through the first transistor T1. A light current $I_2$ is transmitted from the first transistor T1 to a terminal of the second driving signal S(n+1) with the low voltage level through the second transistor T2. As indicated above, the third transistor T3 and the fourth transistor T4 are respectively covered with the third optical filter F3 with the blue color and the fourth optical filter F4 with the green color. Theoretically, the optical filter can perfectly extract the desired light photons with a specific light spectrum band. Under this assumption, no light current is introduced (or say, generated) by the third transistor T3 and the fourth transistor T4. However, without loss of generality, it is assumed that a very weak light current $I_3$ is introduced by the third transistor T3 and the fourth transistor T4. The light current $I_3$ is transmitted from the high voltage terminal Vref_H to the second transistor T2 through the third transistor T3 and the fourth transistor T4. Equivalently, during a time interval between the time point P3 and the time point P4, the light current $I_2$ is equal to the summation of the light current $I_1$ and the light current $I_3$ according to Kirchhoff's Current Law (KCL). Particularly, since the light current $I_1$ is far greater than the light current $I_3$, the light current $I_2$ and the light current $I_1$ are subequal. Thus, during the time interval between the time point P3 and the time point P4, a voltage level of the first terminal of the capacitor C is decreased to a voltage level of the low voltage terminal Vref_L through a current leakage path introducing by the first transistor T1 and the second transistor T2. In the following, in a sample mode of the optical sensor circuit 100, the readout line L receives a voltage signal of the first terminal of the capacitor C. When the voltage level of the first terminal of the capacitor C received by the readout line L is low, the optical sensor circuit 100 determines that a red incident light is inputted. Note that the processing of the optical sensor circuit 100 during the time interval between the time point P3 and the time point P4 is called as an operational mode.

However, when the optical sensor circuit 100 is performed under the operational mode and receives a white ambient light, the first transistor T1, the second transistor T2, the third transistor T3, and the fourth transistor T4 generates the corresponding light currents since a light spectrum of the white ambient light can be decomposed to several spectrum bands (i.e., R/G/B light spectrum bands) and each spectrum band with a corresponding color is received by the corresponding optical filter. Here, the third transistor T3 is coupled to the fourth transistor T4 in forms of parallel connection. A light current $I_4$ is introduced by the summation of light currents generated by the third transistor T3 and the fourth transistor T4. Specifically, the light current $I_4$ is transmitted from the high voltage terminal Vref_H to the second transistor T2 through the third transistor T3 and the fourth transistor T4. A light current $I_5$ generated by the second transistor T2 is transmitted from the first terminal of the second transistor T2 to a terminal of the second driving signal S(n+1) with low voltage level (i.e., say, the second terminal of the second transistor T2). Thus, regardless of the first transistor T1 generates a light current $I_6$. Since the light current $I_4$ is greater than the light current $I_5$, the third transistor T3, the fourth transistor T4 (i.e., they are coupled in form of parallel connection), and the second transistor T2 forms a closed-loop circuit. A light current within the closed-loop circuit is transmitted from the high voltage terminal Vref_H, passing through the third transistor T3 and the fourth transistor T4, and finally reaching the second terminal of the second transistor T2 (i.e., low voltage terminal). As a result, no current leakage path of the first transistor T1 and the second transistor T2 is introduced for discharging energy of capacitor C. In other words, the current leakage path of the first transistor T1 and the second transistor T2 is blocked by the closed-loop circuit. Thus, the voltage level of the first terminal of the capacitor C is approximately maintained to a voltage level of the high voltage terminal (i.e., Vref_H). By doing so, in the following sample mode of the optical sensor circuit 100, the readout line L receives a voltage signal of the first terminal of the capacitor C. Since the voltage level of the first terminal of the capacitor C received by the readout line L is high, the optical sensor circuit 100 determines that no red incident light is inputted. As a result, when the white ambient light is inputted to the optical sensor circuit 100, an error probability of light detection is minimized.

Figure 3:
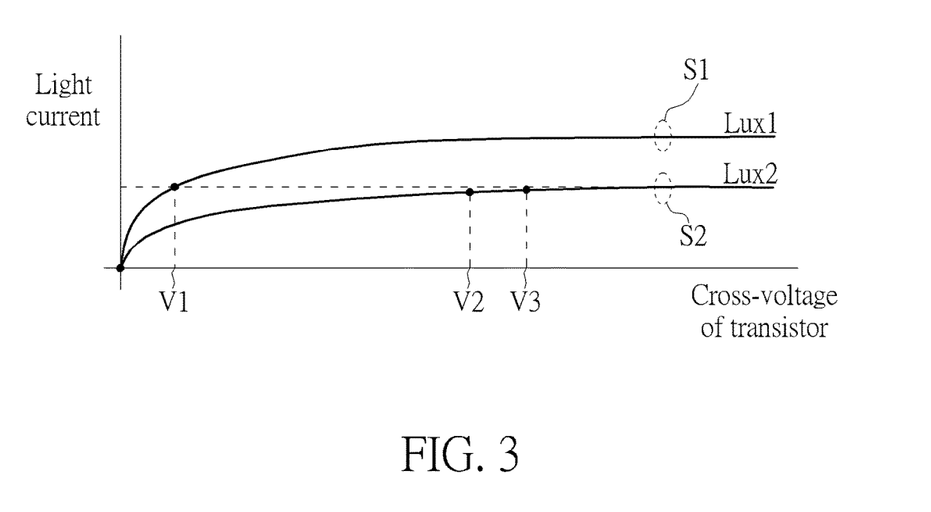
FIG. 3 illustrates a correlation between a light current and a cross voltage of the optical sensor circuit in FIG. 1.

FIG. 3 illustrates a correlation between a light current and a cross voltage of the optical sensor circuit 100 under an operational mode. Specifically, FIG. 3 shows the cross voltage of a closed-loop circuit formed by the third transistor T3, the fourth transistor T4, and the second transistor T2 when the optical sensor circuit 100 receives a white ambient light or an ambient light with slightly red bias. Please also refer to FIG. 1. In the operational mode, the voltage level on a node A is zero under transient state. In the closed-loop circuit, when a light current is transmitted from a high voltage terminal Vref_H to a second terminal of the second transistor T2 (i.e., low voltage terminal) through the third transistor T3 and the fourth transistor T4 (i.e., the third transistor T3 and the fourth transistor T4 are coupled in parallel), the voltage level of the node A changes gradually. With the variation of the voltage level, the light current is also changes accordingly, as illustrated below. In FIG. 3, a curve S1 denotes a correlation between a cross voltage of transistor (i.e., a cross voltage of transistor is defined as a voltage difference between a first terminal and a second terminal of transistor) and the light current when a value of a luminous flux is equal to Lux1. A curve S2 denotes a correlation between the cross voltage of transistor and the light current when the value of the luminous flux is equal to Lux2. Specifically, the value of the luminous flux Lux1 is greater than the value of the luminous flux Lux2. Here, the second transistor T2 is assumed to receive the value of the luminous flux Lux1. The third transistor T3 and the fourth transistor T4 are assumed to receive the value of the luminous flux Lux2. Here, the third transistor T3, the fourth transistor T4, and the second transistor T2 form the closed-loop circuit when they receive the white ambient light. Particularly, the cross voltages of the third transistor T3, the fourth transistor T4, and the second transistor T2 have to satisfy Kirchhoff's Voltage Law (KVL). Thus, when the cross voltage of the third transistor T3 and/or the fourth transistor T4 is decreased V value, the cross voltage of the second transistor T2 is increased V value. As referred to FIG. 1 and FIG. 3, when the cross voltage of the third transistor T3 and/or the fourth transistor T4 is decreased from a value V3 to a value V2, the cross voltage of the second transistor T2 is increased to a value V1.

During the time interval between the time point P4 and the time point P5, as shown in FIG. 2, the waveforms of the first driving signal G(n+1) and the second driving signal S(n+1) are invariant after the time interval between the time point P3 and the time point P4. Thus, the illustrations are omitted here. The difference between two adjacent time intervals is that the third driving signal G(n) becomes a high voltage signal. Thus, after processing the operational mode, a voltage of a first terminal of the capacitor C (i.e., see FIG. 1) is transmitted to a readout line L through the fifth transistor. Here, the processing mode of the optical sensor circuit 100 during the time interval between the time point P4 and the time point P5 is called as a sample mode.

Figure 4:
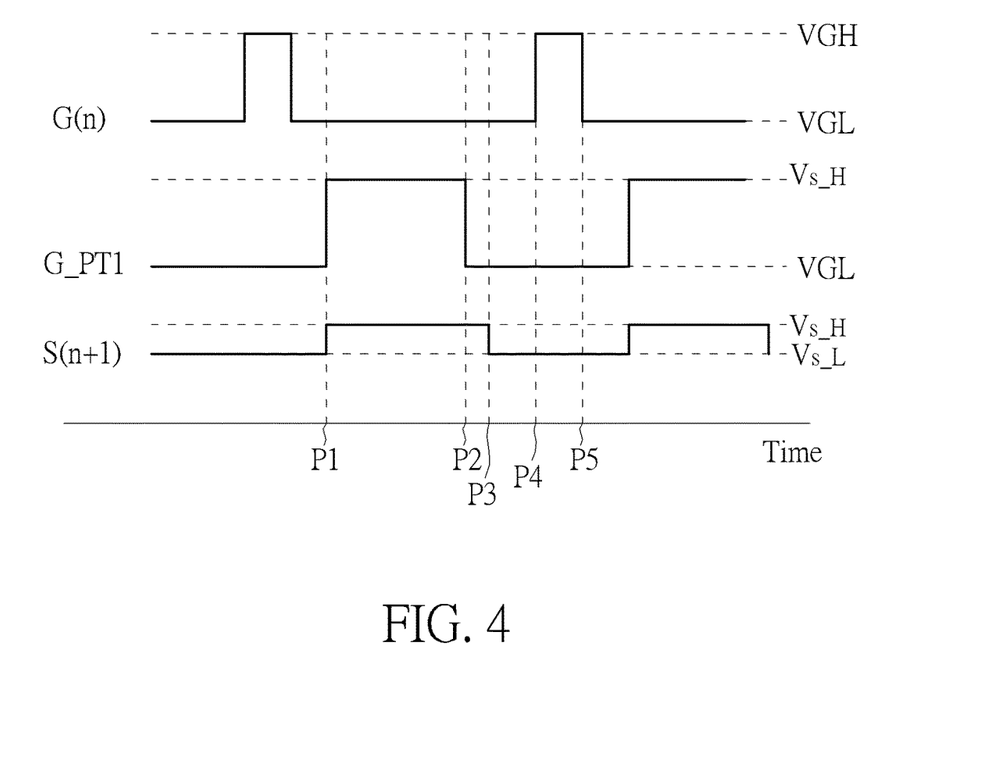
FIG. 4 illustrates waveforms of user-defined diving signals of the optical sensor circuit in FIG. 1.

In the optical sensor circuit 100, the first driving signal, the second driving signal, and the third driving signal are not limited by the definition in above embodiment. In other embodiments, they can be user-defined driving signals. For example, in FIG. 4, a second driving signal G_PT1 of the optical sensor circuit 100 is a user-defined driving signal. Specifically, when a voltage level VGH, a voltage level Vs_H, a voltage level Vs_L, and a voltage level VGL satisfy a condition as VGL<Vs_L<0<Vs_H<VGH, the optical sensor circuit 100 using the driving signals in FIG. 4 has a capability of ambient light resistance.

Figure 5:
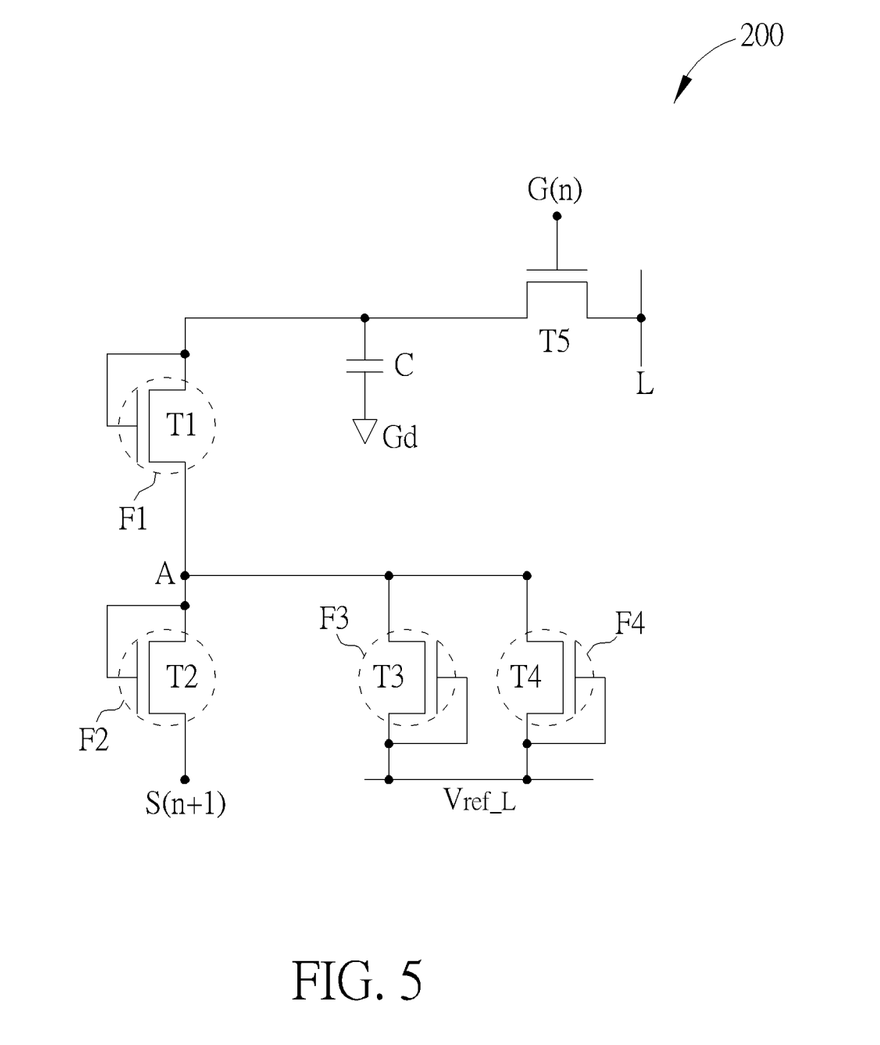
FIG. 5 illustrates an optical sensor circuit according to a second embodiment of the present invention.

FIG. 5 illustrates an optical sensor circuit 200 according to a second embodiment of the present invention. As shown in FIG. 5, the optical sensor circuit 200 includes a capacitor C, a first transistor T1, a second transistor T2, a third transistor T3, a fourth transistor T4, and a fifth transistor T5. The capacitor C includes a first terminal and a second terminal. The second terminal of the capacitor C can be coupled to any reference voltage terminal, such as a ground terminal Gd. A second terminal of the first transistor T1 is coupled to the first terminal of the capacitor C. A control terminal of the first transistor T1 is coupled to a second terminal of the first transistor T1. A first terminal of the second transistor T2 is used for receiving a first driving signal S(n+1). A control terminal of the second transistor T2 is coupled to the first terminal of the first transistor T1. A second terminal of the second transistor T2 is coupled to the control terminal. A first terminal of the third transistor T3 is coupled to the second terminal of the first transistor T1. A control terminal of the third transistor T3 is coupled to a low voltage terminal Vref_L. A second terminal of the third transistor T3 is coupled to the control terminal of the third transistor T3. A first terminal of the fourth transistor T4 is coupled to the first terminal of the third transistor T3. A control terminal of the fourth transistor T4 is coupled to the low voltage terminal Vref_L. A second terminal of the fourth transistor T4 is coupled to the control terminal of the fourth transistor T4. A first terminal of the transistor T5 is coupled to the second terminal of the first transistor T1. A control terminal of the transistor T5 is used for receiving a second driving signal G(n). A second terminal of the transistor T5 is coupled to a readout line L. In the optical sensor circuit 200, the first driving signal S(n+1) denotes as a source driving signal from an output of an $(n+1)^{th}$ data line. The second driving signal G(n) denotes as a gate driving signal from an output of an $n^{th}$ stage shift register, wherein n is a positive integer.

In optical sensor circuit 200, the first transistor T1 is covered with a first optical filter F1. The second transistor T2 is covered with a second optical filter F2. The third transistor T3 is covered with a third optical filter F3. The fourth transistor T4 is covered with a fourth optical filter F4. Each optical filter is used for filtering a specific color. Particularly, two colors with respect to the first optical filter F1 and the second optical filter F2 are identical. The two identical colors with respect to the first optical filter F1 and the second optical filter F2 are chosen from a color set among a red color, a blue color, and a green color. Specifically, two colors with respect to the third optical filter F3 and the fourth optical filter F4 are distinct. The two distinct colors are different from the two identical colors. The two distinct colors with respect to the third optical filter F3 and the fourth optical filter F4 are chosen from a color set among a red color, a blue color, and a green color. The fifth transistor T5 is covered with a light shield. The operation of the optical sensor circuit 200 is illustrated below.

Figure 6:
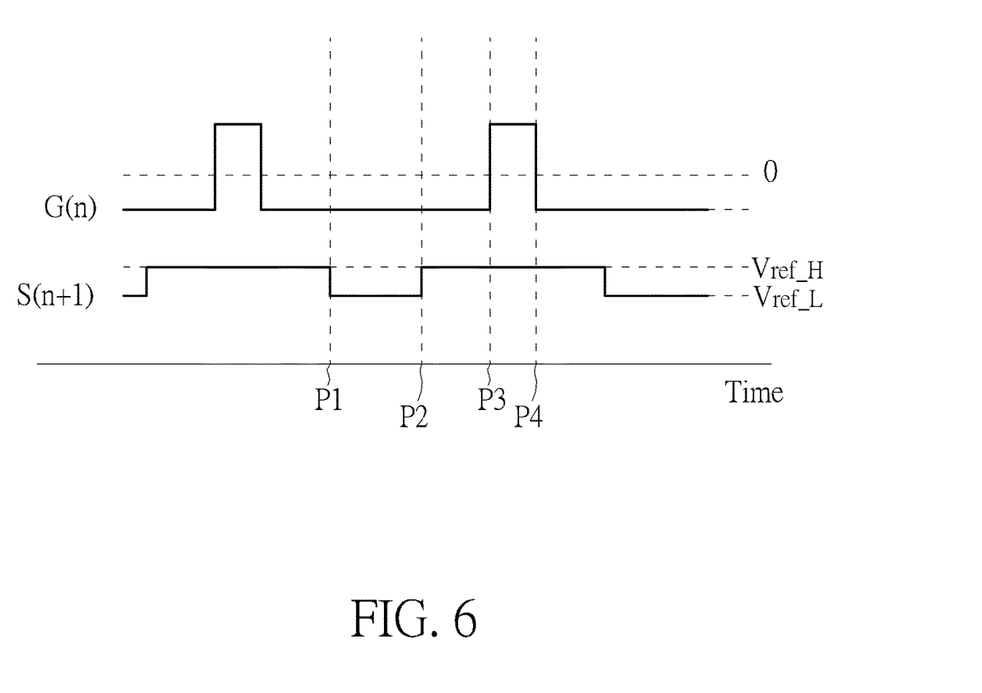
FIG. 6 illustrates waveforms of diving signals of the optical sensor circuit in FIG. 5.

FIG. 6 illustrates waveforms of diving signals of the optical sensor circuit 200. As shown in FIG. 6. The waveforms of diving signals include a first driving signal S(n+1) and a second driving signal G(n). Here, an upper dotted-line on the first driving signal S(n+1) denotes a voltage level of high voltage terminal Vref_H. A lower dotted-line on the first driving signal S(n+1) denotes a voltage level of a low voltage terminal Vref_L. A dotted-line on the second driving signal G(n) denotes a zero voltage level. A time point P1, a time point P2, a time point P3, and a time point P4 are used for partitioning the processing time to several time intervals with respect to several processing modes of the optical sensor circuit 200.

For presentation simplicity, an example of light detection process of the optical sensor circuit 200 during several time intervals is illustrated. Please also refer to FIG. 5. In the optical sensor circuit 200, a color of the first optical filter F1 is a red color. A color of the second optical filter F2 is also the red color. A color of the third optical filter F3 is a blue color. A color of the fourth optical filter F4 is a green color. During the time interval between the time point P1 and the time point P2, the first driving signal S(n+1) becomes a low voltage signal and the second driving signal G(n) maintains a low voltage signal. Thus, in FIG. 5, the control terminal of the first transistor T1 receives a high voltage level from the first terminal of the capacitor C, leading to enable the conduction of the first transistor T1. A current is transmitted from the capacitor C to the first transistor T1. Then, the current passes through the first transistor T1 and is received by the control terminal of the second transistor T2. Since the control terminal of the second transistor T2 receives the current from the capacitor C through the first transistor T1, the conduction of the second transistor T2 is enabled. Since the control terminals of the third transistor T3 and the fourth transistor T4 are coupled to the low voltage terminal Vref_L, the conduction of the third transistor T3 and the fourth transistor T4 is disabled. As a result, the current is transmitted from the first transistor T1 to a terminal of the first driving signal S(n+1) with the low voltage level through the first transistor T1 and the second transistor T2. Thus, during a time interval between the time point P1 and the time point P2, the energy of the capacitor C is discharged so that a voltage level of the capacitor C decreases to a voltage level approximated to the voltage level of the low voltage terminal Vref_L. In the embodiment, the processing mode of the optical sensor circuit 200 during the time interval between the time point P1 and the time point P2 is called as a reset mode.

During a time interval between the time point P2 and the time point P3, the first driving signal S(n+1) becomes a high voltage signal and the second driving signal G(n) maintains a low voltage signal. Here, the control terminal of the first transistor T1 receives the voltage level from the discharged capacitor C. Particularly, since the capacitor C has already been discharged, the control terminal of the first transistor T1 receives a low voltage level approximated to a voltage level of the low voltage terminal Vref_L. Specifically, the control terminal of the first transistor T1, the control terminal of the second transistor T2, the control terminal of the third transistor T3, and the control terminal of the fourth transistor T4 are respectively coupled to the second terminals itself. As a result, a voltage difference (i.e., Vgs) between the control terminal and the second terminal of the first transistor T1 is zero. Similarly, a voltage difference between the control terminal and the second terminal of the second transistor T2 is zero. A voltage difference between the control terminal and the second terminal of the third transistor T3 is zero. A voltage difference between the control terminal and the second terminal of the fourth transistor T4 is zero. Thus, the first transistor T1, the second transistor T2, the third transistor T3, and the fourth transistor T4 are operated under zero bias voltages, and can be respectively used for detecting the corresponding incident light. Since the control terminal of the fifth transistor T5 receives a second driving signal G(n) with low voltage level, the conduction of the fifth transistor T5 is disabled so that the current cannot be transmitted from the fifth transistor T5 to the readout line L. When the optical sensor circuit 200 receives a red light from a laser pen with a red color, a light current $I_1$ is transmitted from the first terminal of the second transistor T2 with high voltage level (i.e., the first terminal of the second transistor T2 is used for receiving the first driving signal S(n+1) with high voltage level) to the first transistor T1. A light current $I_2$ is transmitted from the second transistor T2 to the first terminal of the capacitor C through the first transistor T1. As indicated above, the third transistor T3 and the fourth transistor T4 are respectively covered with the third optical filter F3 with blue color and the fourth optical filter F4 with green color. Theoretically, the optical filter can perfectly extract/pass the desire light photons with a specific light spectrum band. Under this assumption, no light current is introduced by the third transistor T3 and the fourth transistor T4. However, without loss of generality, it is assumed that a very weak light current $I_3$ is introduced by the third transistor T3 and the fourth transistor T4. The light current $I_3$ is transmitted from the third transistor T3 and the fourth transistor T4 to the low voltage terminal Vref_L. By invoking Kirchhoff's Current Law (KCL), the light current $I_1$ is equal to the summation of the light current $I_2$ and the light current $I_3$. Particularly, since the light current $I_2$ is far greater than the light current $I_3$, the light current $I_1$ and the light current $I_2$ are subequal. Thus, during the time interval between the time point P2 and the time point P3, a voltage level of the first terminal of the capacitor C is increased to a voltage level of the high voltage terminal Vref_H through a current charging path introducing by the first transistor T1 and the second transistor T2. In the following, in a sample mode of the optical sensor circuit 200, the readout line L receives a voltage signal of the first terminal of the capacitor C. When the voltage level of the first terminal of the capacitor C received by the readout line L is a high, the optical sensor circuit 200 determines that a red incident light is inputted. Note that the processing of the optical sensor circuit 200 during the time interval between the time point P2 and the time point P3 is called as an operational mode.

However, when the optical sensor circuit 100 is performed under the operational mode and receives a white ambient light, the first transistor T1, the second transistor T2, the third transistor T3, and the fourth transistor T4 generates the corresponding light currents since a light spectrum of the white ambient light can be decomposed to several spectrum bands (i.e., R/G/B light spectrum bands) and each spectrum band with a corresponding color is received by corresponding optical filter. Here, the third transistor T3 is coupled to the fourth transistor T4 in form of parallel connections. A light current $I_4$ is introduced by the summation of light currents generated by the third transistor T3 and the fourth transistor T4. Specifically, the light current $I_4$ is transmitted to the low voltage terminal Vref_L through the third transistor T3 and the fourth transistor T4. A light current $I_5$ generated by the first transistor T1 is transmitted from the first terminal of the transistor T1 to the second transistor T2. Particularly, the second terminal T2 generates a light current $I_6$. Since the light current $I_4$ is greater the light current $I_6$. A leakage path is formed by the first transistor T1, the third transistor T3, and the fourth transistor T4. The light current within the leakage path is transmitted from the first terminal of the first transistor T1 (i.e., the first terminal of the capacitor C) to the low voltage terminal Vref_L through the third transistor T3 and the fourth transistor T4. As a result, by introducing the leakage path, a voltage level of the first terminal of the capacitor C is maintained to a voltage level of the low voltage terminal Vref_L. By doing so, in the following sample mode of the optical sensor circuit 200, the readout line L receives a voltage signal of the first terminal of the capacitor C. Since the voltage level of the first terminal of the capacitor C received by the readout line L is a low, the optical sensor circuit 200 determines that no red incident light is inputted. As a result, when the white ambient light is inputted to the optical sensor circuit 200, an error probability of light detection is minimized.

During a time interval between the time point P3 and the time point P4, the first driving signal S(n+1) is invariant after the time interval between the time point P2 and the time point P3. Thus, the illustration is omitted here. The difference between two adjacent time intervals is that the second driving signal G(n) becomes a high voltage signal. Thus, after processing the operational mode, a voltage of a first terminal of the capacitor C (i.e., see FIG. 5) is transmitted to a readout line L through the fifth transistor T5. Here, the processing mode of the optical sensor circuit 200 during the time interval between the time point P3 and the time point P4 is called as a sample mode.

Figure 7:
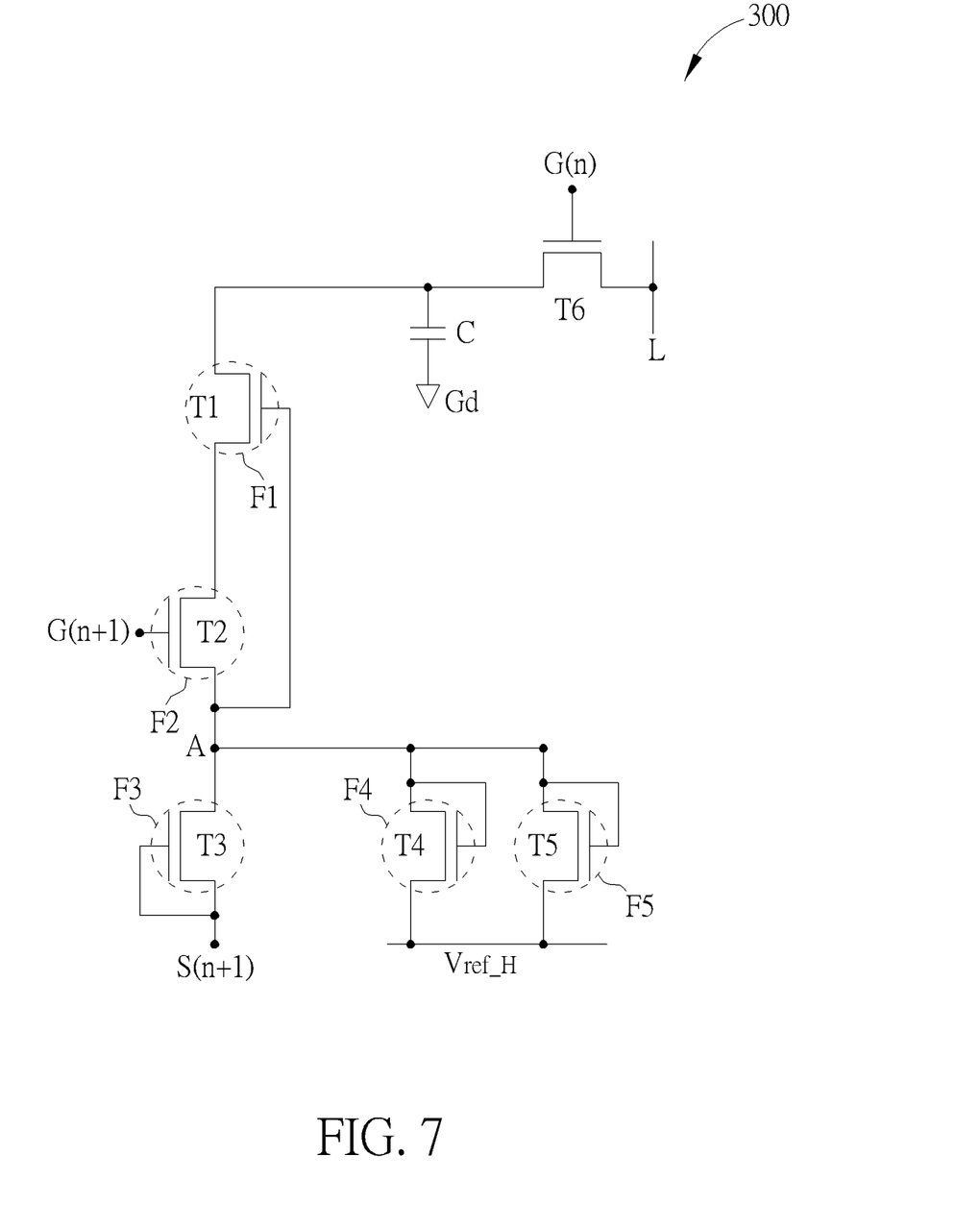
FIG. 7 illustrates an optical sensor circuit according to a third embodiment of the present invention.

FIG. 7 illustrates an optical sensor circuit 300 according to a third embodiment of the present invention. As shown in FIG. 7, the optical sensor circuit 300 includes a capacitor C, a first transistor T1, a second transistor T2, a third transistor T3, a fourth transistor T4, a fifth transistor T5, and a sixth transistor T6. The capacitor C includes a first terminal and a second terminal. The second terminal of the capacitor C can be coupled to any reference voltage terminal, such as a ground terminal Gd. A first terminal of the first transistor T1 is coupled to the first terminal of the capacitor C. A first terminal of the second transistor T2 is coupled to a second terminal of the first transistor T1. A control terminal of the second transistor T2 is used for receiving a first driving signal G(n+1). A second terminal of the second transistor T2 is coupled to the control terminal of the first transistor T1. A first terminal of the third transistor T3 is coupled to the second terminal of the second transistor T2. A control terminal of the third transistor T3 is used for receiving a second driving signal S(n+1). A second terminal of the third transistor T3 is coupled to the control terminal of the third transistor T3. A first terminal of the fourth transistor T4 is coupled to a high voltage terminal Vref_H. A control terminal of the fourth transistor T4 is coupled to the first terminal of the third transistor T3. A second terminal of the fourth transistor T4 is coupled to the control terminal of the fourth transistor T4. A first terminal of the fifth transistor T5 is coupled to the first terminal of the fourth transistor. A control terminal of the fifth transistor T5 is coupled to the control terminal of the fourth transistor T4. A second terminal of the fifth transistor T5 is coupled to the control terminal of the fifth transistor T5. A first terminal of the sixth transistor T6 is coupled to the first terminal of the first transistor T1. A control terminal of the sixth transistor T6 is used for receiving a third driving signal G(n). A second terminal of the sixth transistor T6 is coupled to a readout line L. In the optical sensor circuit 300, the first driving signal G(n+1) denotes as a gate driving signal from an output of an $(n+1)^{th}$ stage shift register. The second driving signal S(n+1) denotes as a source driving signal from an output of an $(n+1)^{th}$ data line. The third driving signal G(n) denotes as a gate driving signal from an output of an $n^{th}$ stage shift register, wherein n is a positive integer.

In the optical sensor circuit 300, the first transistor T1 is covered with a first optical filter F1. The second transistor T2 is covered with a second optical filter F2. The third transistor T3 is covered with a third optical filter F3. The fourth transistor T4 is covered with a fourth optical filter F4. The fifth transistor T5 is covered with a fifth optical filter F5. Each optical filter is used for filtering a specific color. Particularly, three colors with respect to the first optical filter F1, the second optical filter F2, and the third optical filter F3 are identical. The three identical colors with respect to the first optical filter F1, the second optical filter F2, and the third optical filter F3 are chosen from a color set among a red color, a blue color, and a green color. Specifically, two colors with respect to the fourth optical filter F4 and the fifth optical filter F5 are distinct. The two distinct colors are different from the three identical colors. The two distinct colors with respect to the fourth optical filter F4 and the fifth optical filter F5 are chosen from the color set among the red color, the blue color, and the green color. The sixth transistor T6 is covered with a light shield. In the optical sensor circuit 300, all driving signals are similar to the optical sensor circuit 100. Instead of the first transistor T1 in the optical sensor circuit 100, the first transistor T1 coupled to the second transistor T2 in series are introduced in the optical sensor circuit 300. Thus, all processing modes of light detection of the optical sensor circuit 300 are similar to all processing modes of light detection of the optical sensor circuit 100. Particularly, since the first transistor T1 and the second transistor T2 in series connection are introduced in the optical sensor circuit 300, the optical sensor circuit 300 has greater RC-delay than the optical sensor circuit 100, leading to improve the robustness of ambient light resistance. Since all time intervals, all time points, all processing modes of the optical sensor circuit 300 are similar to the optical sensor circuit 100, the illustration is omitted here.

In brief, the present invention illustrates various optical sensor circuits. Specifically, an idea for detecting a specific incident light signal of an optical sensor circuit 100 and an optical sensor circuit 300 is to observe whether a capacitor C is discharged down to a low voltage level. When a voltage level of a first terminal of the capacitor C is low under a sample mode, the optical sensor circuits 100 and 300 determine that the specific incident light is inputted. Thus, a detection type of the optical sensor circuits 100 and 300 is called as a discharging type. Further, an idea for detecting the specific incident light signal of an optical sensor circuit 200 is to observe whether a capacitor C is charged up to a high voltage level. When a voltage level of the first terminal of the capacitor C is high under the sample mode, the optical sensor circuit 200 determines that the specific incident light is inputted. Thus, a detection type of the optical sensor circuit 200 is called as a charging type.

To sum up, the present invention provides several optical sensor circuits for detecting light signal with a specific color. Specifically, these optical sensor circuits have a capability of white ambient light resistance. The error probability of a light (i.e., light with the specific color) detection is also minimized. The idea of white ambient light resistance is to use a closed-loop circuit of the optical sensor circuit with discharging type or a leakage path of the optical sensor circuit with charging type for making a discharge/charge operation of a capacitor maintain a normal condition. Thus, the optical sensor circuit can responses a correct light detection result according to the specific color.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensor circuit, comprising:
   a capacitor comprising:
      a first terminal; and
      a second terminal coupled to a reference voltage terminal;
   a first transistor comprising:
      a first terminal coupled to the first terminal of the capacitor;
      a control terminal; and
      a second terminal;
   a second transistor comprising:
      a first terminal coupled to the second terminal of the first transistor;
      a control terminal; and
      a second terminal;
   a third transistor comprising:
      a first terminal coupled to a first voltage terminal;
      a control terminal; and
      a second terminal coupled to the second terminal of the first transistor;
   a fourth transistor comprising:
      a first terminal coupled to the first terminal of the third transistor;
      a control terminal; and
      a second terminal coupled to the second terminal of the first transistor; and
   a fifth transistor comprising:
      a first terminal coupled to the first terminal of the first transistor;
      a control terminal; and
      a second terminal coupled to a readout line.

2. The circuit of claim 1, wherein the reference voltage terminal is a ground terminal.

3. The circuit of claim 1, wherein the first voltage terminal is a high voltage terminal.

4. The circuit of claim 1, wherein the control terminal of the first transistor is used for receiving a first driving signal, the control terminal of the second transistor is configured to receive a second driving signal, and the control terminal of the fifth transistor is configured to receive a third driving signal.

5. The circuit of claim 4, wherein the first driving signal is a gate driving signal from an output of an $(n+1)^{th}$ stage shift register, the second driving signal is a source driving signal from an output of an $(n+1)^{th}$ data line, the third driving signal is a gate driving signal from an output of an $n^{th}$ stage shift register, and n is a positive integer.

6. The circuit of claim 1, wherein the second terminal of the second transistor is configured to receive a first driving signal and the control terminal of the fifth transistor is configured to receive a second driving signal.

7. The circuit of claim 6, wherein the first driving signal is a source driving signal from an output of an $(n+1)^{th}$ data line, the second driving signal is a gate driving signal from an output of an $n^{th}$ stage shift register, and n is a positive integer.

8. The circuit of claim 1, wherein the first transistor and the second transistor are respectively covered with two optical filters, each optical filter is configured to filter a color, two colors with respect to two optical filters are identical, and the two identical colors are chosen from a color set among a red color, a blue color, and a green color.

9. The circuit of claim 8, wherein the third transistor and the fourth transistor are respectively covered with two optical filters, each optical filter is configured to filter a color, two colors with respect to two optical filters are distinct, the two distinct colors are different from the two identical colors, and the two distinct colors are chosen from a color set among a red color, a blue color, and a green color.

10. An optical sensor circuit, comprising:
    a capacitor comprising:
       a first terminal; and
       a second terminal coupled to a reference voltage terminal;
    a first transistor comprising:
       a first terminal;
       a control terminal coupled to the first terminal of the capacitor; and
       a second terminal coupled to the control terminal of the first transistor;
    a second transistor comprising:
       a first terminal configured to receive a first driving signal;
       a control terminal coupled to the first terminal of the first transistor; and
       a second terminal coupled to the control terminal of the second transistor;
    a third transistor comprising:
       a first terminal coupled to the second terminal of the second transistor;
       a control terminal coupled to a low voltage terminal; and
       a second terminal coupled to the control terminal of the third transistor;
    a fourth transistor comprising:
       a first terminal coupled to the first terminal of the third transistor;
       a control terminal coupled to the low voltage terminal; and
       a second terminal coupled to the control terminal of the fourth transistor; and
    a fifth transistor comprising:
       a first terminal coupled to the first terminal of the capacitor;
       a control terminal configured to receive a second driving signal; and
       a second terminal coupled to a readout line.

11. The circuit of claim 10, wherein the first driving signal is a source driving signal from an output of an $(n+1)^{th}$ data line, the second driving signal is a gate driving signal from an output of an $n^{th}$ stage shift register, and n is a positive integer.

12. The circuit of claim 10, wherein the first transistor and the second transistor are respectively covered with two optical filters, each optical filter is configured to filter a color, two colors with respect to two optical filters are identical, and the two identical colors are chosen from a color set among a red color, a blue color, and a green color.

13. The circuit of claim 12, wherein the third transistor and the fourth transistor are respectively covered with two optical filters, each optical filter is configured to filter a color, two colors with respect to two optical filters are distinct, and the two distinct colors are chosen from a color set among a red color, a blue color, and a green color.

14. An optical sensor circuit, comprising:
    a capacitor comprising:
       a first terminal; and
       a second terminal coupled to a reference voltage terminal;
    a first transistor comprising:
       a first terminal coupled to the first terminal of the capacitor;

a control terminal; and
a second terminal;
a second transistor comprising:
a first terminal coupled to the second terminal of the first transistor;
a control terminal configured to receive a first driving signal; and
a second terminal coupled to the control terminal of the first transistor;
a third transistor comprising:
a first terminal coupled to the second terminal of the second transistor;
a control terminal configured to receive a second driving signal; and
a second terminal coupled to the control signal of the third transistor;
a fourth transistor comprising:
a first terminal coupled to a high voltage terminal;
a control terminal coupled to the first terminal of the third transistor; and
a second terminal coupled to the control terminal of the fourth transistor;
a fifth transistor comprising:
a first terminal coupled to the first terminal of the fourth transistor;
a control terminal coupled to the second terminal of the fourth transistor; and
a second terminal coupled to the control terminal of the fifth transistor; and
a sixth transistor comprising:
a first terminal coupled to the first terminal of the capacitor;
a control terminal configured to receive a third driving signal; and
a second terminal coupled to a readout line.

15. The circuit of claim 14, wherein the first driving signal is a
gate driving signal from an output of an $(n+1)^{th}$ stage shift register, the second driving signal is a source driving signal from an output of an $(n+1)^{th}$ data line, the third driving signal is a gate driving signal from an output of an $n^{th}$ stage shift register, and n is a positive integer.

16. The circuit of claim 14, wherein the first transistor, the second transistor, and the third transistor are respectively covered with three optical filters, each optical filter is configured to filter a color, three colors with respect to three optical filters are identical, and the three identical colors are chosen from a color set among a red color, a blue color, and a green color.

17. The circuit of claim 16, wherein the fourth transistor and the fifth transistor are respectively covered with two optical filters, each optical filter is configured to filter a color, two colors with respect to two optical filters are distinct, the two distinct colors are different from the three identical colors, and the two distinct colors are chosen from a color set among a red color, a blue color, and a green color.

* * * * *